United States Patent
Chen et al.

(10) Patent No.: US 12,527,647 B2
(45) Date of Patent: Jan. 20, 2026

(54) METHOD FOR USING CBCT FOR AUTOMATICALLY POSITIONING TOOTH

(71) Applicant: Fussen Technology Co., Ltd., Shenzhen (CN)

(72) Inventors: Alan Chen, Shenzhen (CN); John Yep, Chengdu (CN)

(73) Assignee: Fussen Technology Co., Ltd., Shenzhen (CN)

( * ) Notice: Subject to any disclaimer, the term of this patent is extended or adjusted under 35 U.S.C. 154(b) by 953 days.

(21) Appl. No.: 17/720,253

(22) Filed: Apr. 13, 2022

(65) Prior Publication Data
US 2023/0263593 A1    Aug. 24, 2023

(30) Foreign Application Priority Data
Feb. 23, 2022 (CN) .......................... 202210171145.2

(51) Int. Cl.

| | |
|---|---|
| A61C 7/00 | (2006.01) |
| A61B 6/03 | (2006.01) |
| A61B 6/40 | (2024.01) |
| A61B 6/46 | (2024.01) |
| A61B 6/51 | (2024.01) |
| G06T 7/30 | (2017.01) |
| G06T 15/00 | (2011.01) |
| G06T 15/08 | (2011.01) |

(52) U.S. Cl.
CPC .............. *A61C 7/002* (2013.01); *A61B 6/032* (2013.01); *A61B 6/4085* (2013.01); *A61B 6/465* (2013.01); *A61B 6/51* (2024.01); *G06T 15/005* (2013.01); *G06T 15/08* (2013.01); *G06T 7/30* (2017.01)

(58) Field of Classification Search
None
See application file for complete search history.

(56) References Cited

U.S. PATENT DOCUMENTS

| | | | |
|---|---|---|---|
| 2020/0146646 A1* | 5/2020 | Tuzoff | A61B 6/463 |
| 2020/0320685 A1* | 10/2020 | Anssari Moin | G06N 3/08 |
| 2023/0274431 A1* | 8/2023 | Uno | G06T 7/75 |
| | | | 382/128 |
| 2024/0033041 A1* | 2/2024 | Chernov | A61B 6/5217 |

FOREIGN PATENT DOCUMENTS

| | | |
|---|---|---|
| CN | 106113351 A | 11/2016 |
| CN | 106154215 A | 11/2016 |
| CN | 108495597 A | 9/2018 |

* cited by examiner

*Primary Examiner* — Jeffrey J Chow
(74) *Attorney, Agent, or Firm* — Nitin Kaushik

(57) ABSTRACT

The present invention relates to the technical field of dental medical treatment, and specifically discloses a method for using a CBCT (Cone Beam Computer Tomography) for automatically positioning a tooth, which comprises the following steps: S01, archiving CT data; S02, calculating AI and generating AI results; S03, entering CT reading by a client; S04, downloading and loading the CT data; S05, opening a function of a tooth lens; S06, selecting a corresponding tooth position in a tooth position list; and S07, selecting a 3D tooth rendering mode. The function of the 'tooth lens' is added into traditional CT reading, which is suitable for clinical disease diagnoses such as 'tooth extraction, root canal therapy, tooth repair' and the like in oral treatment, and doctors can precisely and quickly position the single tooth through selection for the tooth position, which facilitates more comprehensive analysis.

7 Claims, 3 Drawing Sheets

METHOD FOR USING CBCT FOR AUTOMATICALLY POSITIONING TOOTH

CROSS-REFERENCE TO RELATED APPLICATIONS

The application claims priority to Chinese patent application No. 202210171145.2, filed on Feb. 23, 2022, the entire contents of which are incorporated herein by reference.

TECHNICAL FIELD

The present invention relates to the technical field of dental medical treatment, and specifically relates to a method for using a CBCT (Cone Beam Computer Tomography) for automatically positioning a tooth.

BACKGROUND

Oral diseases are more complicated, and precise auxiliary tools such as radiography check are needed to make a definite diagnosis. Doctors need to make many measurements and analyses on CT (Computed Tomography) photographs, namely the check of 'seeing the essence through the phenomenon' and 'going deep into the interior', so that diagnoses made sequentially can be more comprehensive and more reliable. At present, for the functions provided by CT reading in the market, the treatment analysis on a single tooth is cumbersome, and the effective visual effects can be obtained through multiple operations.

In the market, the viewing angles of CT reading are an MPR (Multi-Planar Reconstruction) viewing angle, a coronal plane, a sagittal plane, a horizontal plane and a viewing angle of a 3D (Three-dimensional) view, so that the tooth cannot be analyzed and viewed directly from the view of the single tooth. Parameters need to be adjusted from the jaw to view the tooth, and at the same time, the corresponding tooth can be positioned through multiple complicated operations such as adjusting a navigation line, amplification, adjusting the angle and so on. In the 3D view, due to more contents and overlapping of images, even if the transparency can be adjusted, the presentation of the tooth is still not clear enough, and there are too many interference contents. Therefore, the present invention provides a method for using a CBCT (Cone Beam Computer Tomography) for automatically positioning a tooth.

SUMMARY

1. Technical Problems to Be Solved

For the defects of the prior art, the present invention provides a method for using a CBCT (Cone Beam Computer Tomography) for automatically positioning a tooth, so as to solve the problems provided in the background.

2. Technical Scheme

In order to achieve the above purposes, the present invention provides the following technical scheme:
S01, archiving CT data;
S02, calculating AI and generating AI results;
S03, entering CT reading by a client;
S04, downloading and loading the CT data;
S05, opening a function of a tooth lens;
S06, selecting a corresponding tooth position in a tooth position list; and
S07, selecting a 3D tooth rendering mode.

Further, according to Step S01, before using CT reading that supports a 'tooth lens', firstly, archiving the CT data of a patient and generating an only ID (Identity Card) used for marking the CT data.

Further, according to Step S02, starting a task by an AI calculation program, beginning to calculate the AI results, extracting anatomical structure and position information of the tooth, intraoral information and jaw relation coordinate information, and archiving extracted data to a directory at the same level with the CT data.

Further, according to Step S03, opening software by a client, selecting the data of the patient and entering CT reading.

Further, according to Step S04, indexing the data from the archiving position by the software according to the ID of the selected CT data when entering the software and loading the data into a memory.

Further, according to Step S05, searching the directory at the same level with the CT data in a traversing manner by the software after the loading of the CT data is completed, and viewing that whether result data generated by AI exists, wherein two situations are specifically described as follows:
1) the result data generated by AI exists: a 'tooth lens' button becomes a clickable state, and the function of the 'tooth lens' is opened; and
2) the result data generated by AI does not exist: the 'tooth lens' button becomes a forbidden state.

Further, according to Step S06, clicking a function button of the 'tooth lens', selecting a corresponding tooth position from a tooth position list on the left side, reading the AI result data under the directory, in which the CT data is archived, by the software, and positioning a coronal plane, a sagittal plane and a horizontal plane to the position, at which the tooth is located, according to the tooth position information and the jaw relation coordinate information that are extracted by AI.

Further, according to Step S07, displaying the tooth at the corresponding position in a 3D (Three-dimensional) window, wherein the rendering for the tooth comprises three modes which are specifically described as follows:
1) a tooth body surface mode;
2) a root canal perspective mode; and
3) a 3D perspective mode.

Further, the rendering of the three modes is specifically realized as follows:
1) the tooth body surface mode, i.e. the rendering for a single tooth:
acquiring a data range with the same size as CT (Computed Tomography) based on the AI calculation result in Step S02, wherein the AI position [x, y, z] corresponds to the original CT position [x, y, z], and the AI results also comprises a tooth segmentation list and tooth region information; and separating a tooth data region with a designated No. according to the information, wherein the algorithm flow thereof is specifically described as follows:
① data preprocessing: the loaded data comprises two parts: tooth AI segmentation results and CT; corresponding data is separated from the whole AI results according to the tooth No.; the data form thereof is a 3D array ([width, height, depth]); the AI results correspond to the CT values one to one in a data space; the corresponding CT data is separated according to the AI segmentation results; and interference data in CT can be removed according to effective information (non-zero value) in tooth segmentation data, so as to acquire an intact tooth outline form;

② boundary smoothing: a 'sawtooth' phenomenon appears on the tooth surface in tooth CT separated according to the AI tooth segmentation results, the generated 'sawtooth' is mainly caused by the precision of the segmentation results, and therefore, the surface needs to be smoothed before rendering; and through adoption of a Gaussian Blur algorithm, the noise is reduced, and the level of details is lowered; and the algorithm specifically comprises the following steps:

I. firstly, screening a boundary region:
if a 0 value exists in the corresponding AI values in a cubic region which takes an optional position [x, y, z] as the center and has the side length of 2, the region is judged to be the boundary region; and II. carrying out fuzzy processing on a boundary CT region: the size of a fuzzy kernel (3*3*3) is the most reasonable size; the CT value of the position [x, y, z] of the fuzzy center is determined commonly by surrounding 27 values; the CT contribution degree of each position is determined by the length from each position to the fuzzy center; and the contribution factor is exp(−length);

③ rendering: the CT data of the tooth after being smoothed is written into a GPU (Graphics Processing Unit), and an image is rendered finally;

2) the root canal perspective mode, i.e. minimum intensity projection:
the minimum intensity projection refers to a process of selecting the minimum value from sampling points obtained by volume data projected by rays, rendering and imaging according to the minimum value, and a minimum intensity projection algorithm is described as follows:

① data preprocessing: the data preprocessing flow of the minimum intensity projection is the same as the preprocessing flow of rendering the surface of the single tooth;

② edge smoothing and de-noising: MIP (Maximum Intensity Projection) processing comprises two core parts: eliminating the surface noise interference and eliminating the 'sawtooth' phenomenon; the value domain range of CT is [0, 1.0], the value domain range of the tooth surface is about more than or equal to 0.3, and the value domain range of the noise is about [0, 0.1]; a 'value rise' operation is carried out on the CT region in a surface region of an outer layer according to the relation, so as to eliminate the noise in the surface region; according to the AI results, the CT data region corresponding to the invalid value 0 region is endowed with the maximum value 1.0, then Gaussian Blur is carried out on the tooth surface with the reference of Step S01, and the CT value of the surface region after fuzzing is increased; the interference on the minimum value on an access path is not generated, and at the same time, the value of the tooth region is ensured to be less than 1.0; when the overall CT value of the tooth surface is increased through 'value rise', a 'highlight' region is generated on the tooth edge in the rendering result; a method for solving the 'highlight' phenomenon is that: the CT data before 'value rise' is copied, the 'value rise' operation is also carried out on the data, and the data is endowed with 0.5 (not 1.0); the noise on the surface is eliminated, but the tooth region cannot be separated; and the value 1.0 in the former 'value rise' is taken as mask information, namely the CT data of 'sawtooth' can be separated;

③ rendering: two pieces of CT data after smoothing and de-noising is written into the GPU, and then a final minimum intensity projection effect is rendered according to the rendering flow; and 3) the 3D perspective mode, i.e. iso-surface rendering:
the whole implementation algorithm flow of the iso-surface rendering is described as follows:

① data preprocessing:
the data preprocessing flow of the iso-surface rendering is the same as the preprocessing flow of rendering the surface of the single tooth;

② boundary smoothing:
the boundary smoothing flow of the iso-surface rendering is the same as the smoothing flow of rendering the surface of the single tooth; and ③ rendering:
volume data rendering is obtained by accumulating colors (r, g, b) and transparency (alpha) of all the sampling points on a light projection path according to a formula, wherein the colors and the transparency are obtained by texture mapping according to sampling CT values, and therefore, a method for realizing specific CT value domain rendering by a function for controlling the transparency is designed; the core content thereof is generating the control function of the transparency according to gradient distribution information; firstly, the gradient value $\Delta f$ of any CT value $f(x, y, z)$ in the tooth region is calculated, the specific 'iso-surface' value fx and the original transparency alpha1 corresponding to the CT value $f(x,y,z)$ are selected, and the control function: alpha2=$f(\Delta f, fx)$*alpha1 is generated according to the gradient value $\Delta f$ and the specific 'iso-surface' value fx; and a new transparency value is obtained after processing, alpha2 is taken as the new transparency value for volume rendering, namely the rendering effect near a specific 'iso-surface' fx region can be obtained.

3. Beneficial Effects

Compared with the prior art, the present invention provides the method for using the CBCT for automatically positioning the tooth, which has the following beneficial effects:

1. The function of a 'tooth lens' is added into traditional CT reading, which is suitable for clinical disease diagnoses such as 'tooth extraction, root canal therapy, tooth repair' and the like in oral treatment, and doctors can precisely and quickly position the single tooth through selection for the tooth position, which facilitates more comprehensive analysis;

2. Compared with the traditional technology, the selected tooth position is precisely positioned by the 'tooth lens' through a series of methods such as AI (Artificial Intelligence) identification, position matrix transformation, rendering and the like; the tooth position is taken as a visual center, and the effects of horizontal section, mesiodistal section, buccolingual section and 3D reconstructed images are provided; sections in the directions can be correspondingly generated in other windows through operation points of a 2D (Two-dimensional) section navigation line; a 3D window has a tooth body surface mode, a root canal perspective mode and a 3D perspective mode, which facilitates visual viewing for different effects of teeth including a mesiodistal cheek root, a palate root and the like; and the range of the imaging threshold and the transparency of an image can be adjusted for the tooth body surface mode by adjusting the 3D view. By switching three modes of the tooth body surface mode, the root canal perspective mode and the 3D perspective mode, dental hard tissues, medullary canals and root canals can be viewed simultaneously through the 3D reconstructed image, which assists the doctors to make a diagnosis and a treatment for endodontics; the teeth can be viewed to be semitransparent; a more precise and more clear imaging manner can be provided for dentists through clear outlines of the medullary canals; and the method is simple, convenient and visual, so that the diagnosis efficiency and accuracy can be improved for the dentists.

DETAILED DESCRIPTION OF THE EMBODIMENTS

Figure 1:
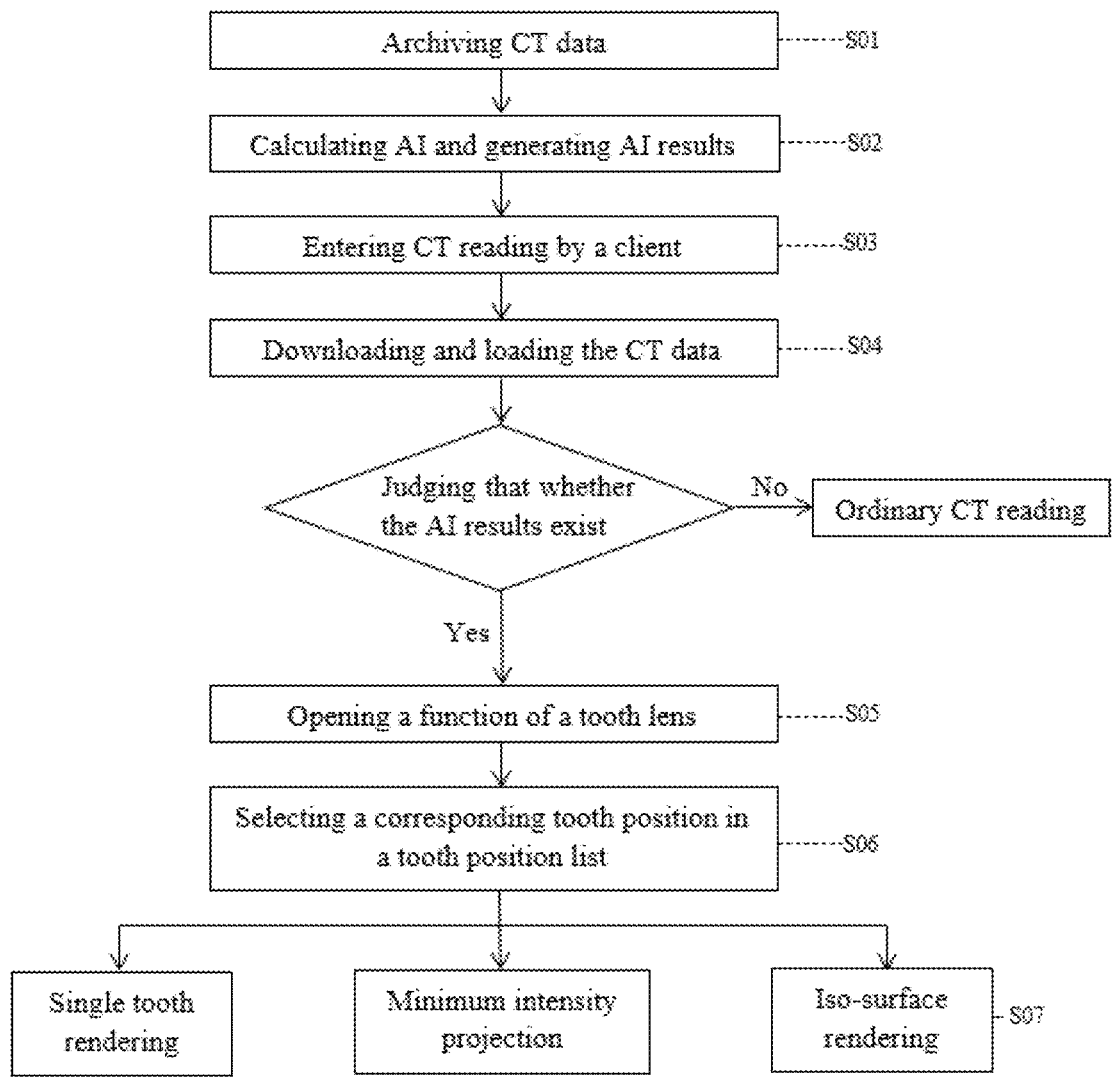
FIG. 1 is an overall flow chart of the present invention.

The present invention provides the technical scheme which is a method for using a CBCT (Cone Beam Computer Tomography) for automatically positioning a tooth. As shown in FIG. 1, the method comprises the following steps:
S01, archiving CT data;
S02, calculating AI and generating AI results;
S03, entering CT reading by a client;
S04, downloading and loading the CT data;
S05, opening a function of a tooth lens;
S06, selecting a corresponding tooth position in a tooth position list; and
S07, selecting a 3D tooth rendering mode.

Further, according to Step S01, before using CT reading that supports a 'tooth lens', firstly, archiving the CT data of a patient and generating an only ID (Identity Card) used for marking the CT data.

Further, according to Step S02, starting a task by an AI calculation program, beginning to calculate the AI results, extracting anatomical structure and position information of the tooth, intraoral information and jaw relation coordinate information, and archiving extracted data to a directory at the same level with the CT data.

Further, according to Step S03, opening software by a client, selecting the data of the patient and entering CT reading.

Further, according to Step S04, indexing the data from the archiving position by the software according to the ID of the selected CT data when entering the software and loading the data into a memory.

Further, according to Step S05, searching the directory at the same level with the CT data in a traversing manner by the software after the loading of the CT data is completed, and viewing that whether result data generated by AI exists, wherein two situations are specifically described as follows:
1) the result data generated by AI exists: a 'tooth lens' button becomes a clickable state, and the function of the 'tooth lens' is opened; and
2) the result data generated by AI does not exist: the 'tooth lens' button becomes a forbidden state.

Further, according to Step S06, clicking a function button of the 'tooth lens', selecting a corresponding tooth position from a tooth position list on the left side, reading the AI result data under the directory, in which the CT data is archived, by the software, and positioning a coronal plane, a sagittal plane and a horizontal plane to the position, at which the tooth is located, according to the tooth position information and the jaw relation coordinate information that are extracted by AI.

Further, according to Step S07, displaying the tooth at the corresponding position in a 3D (Three-dimensional) window, wherein the rendering for the tooth comprises three modes which are specifically described as follows:
1) a tooth body surface mode;
2) a root canal perspective mode; and
3) a 3D perspective mode.

Further, the rendering of the three modes is specifically realized as follows:
1) the tooth body surface mode, i.e. the rendering for a single tooth:
acquiring a data range with the same size as CT (Computed Tomography) based on the AI calculation result in Step S02, wherein the AI position [x, y, z] corresponds to the original CT position [x, y, z], and the AI results also comprises a tooth segmentation list and tooth region information; and separating a tooth data region with a designated No. according to the information, wherein the algorithm flow thereof is specifically described as follows:
① data preprocessing: the loaded data comprises two parts: tooth AI segmentation results and CT; corresponding data is separated from the whole AI results according to the tooth No.; the data form thereof is a 3D array ([width, height, depth]); the AI results correspond to the CT values one to one in a data space; the corresponding CT data is separated according to the AI segmentation results; and interference data in CT can be removed according to effective information (non-zero value) in tooth segmentation data, so as to acquire an intact tooth outline form;
② boundary smoothing: a 'sawtooth' phenomenon appears on the tooth surface in tooth CT separated according to the AI tooth segmentation results, the generated 'sawtooth' is mainly caused by the precision of the segmentation results, and therefore, the surface needs to be smoothed before rendering; and through adoption of a Gaussian Blur algorithm, the noise is reduced, and the level of details is lowered; and the algorithm specifically comprises the following steps:
I. firstly, screening a boundary region:
if a 0 value exists in the corresponding AI values in a cubic region which takes an optional position [x, y, z] as the center and has the side length of 2, the region is judged to be the boundary region; and
II. carrying out fuzzy processing on a boundary CT region: the size of a fuzzy kernel (3*3*3) is the most reasonable size; the CT value of the position [x, y, z] of the fuzzy center is determined commonly by surrounding 27 values; the CT contribution degree of each position is determined by the length from each position to the fuzzy center; and the contribution factor is exp(−length);
③ rendering: the CT data of the tooth after being smoothed is written into a GPU (Graphics Processing Unit), and an image is rendered finally.

Figure 3:
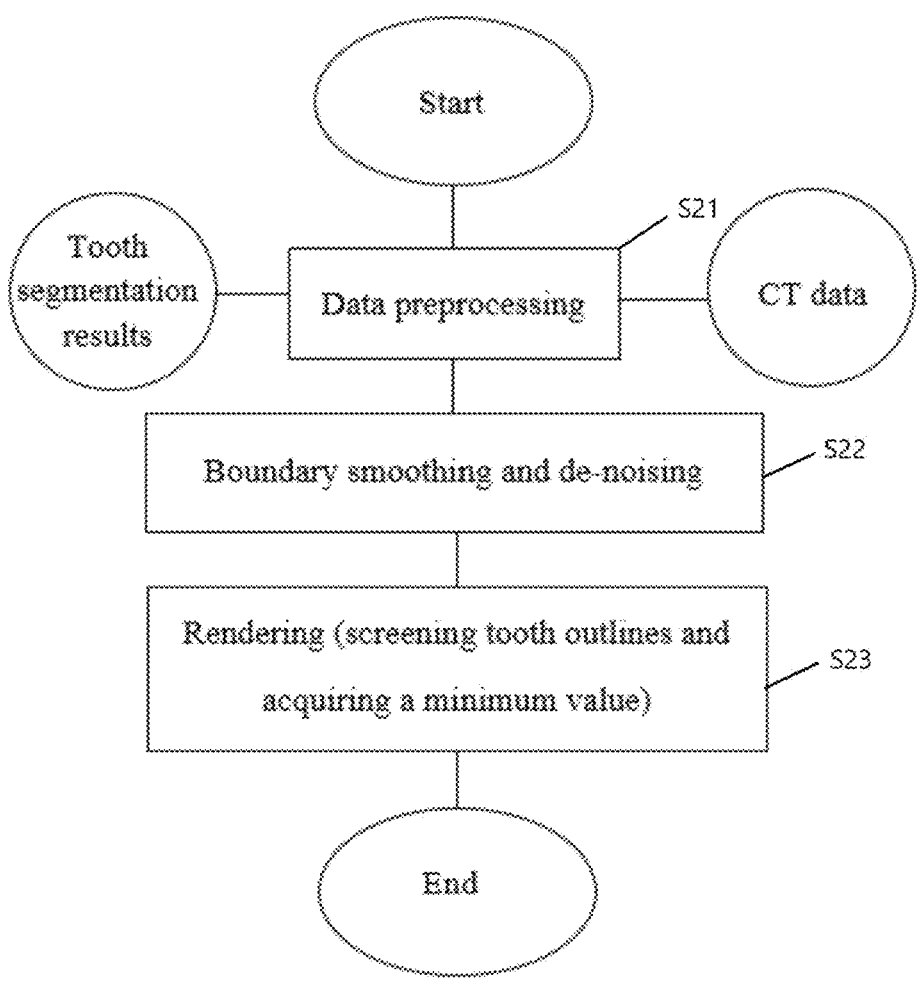
FIG. 3 is a flow chart of a tooth rendering algorithm of the present invention.

As shown in FIG. 3, 2), a root canal perspective mode, i.e. minimum intensity projection:

the minimum intensity projection refers to a process of selecting the minimum value from sampling points obtained by volume data projected by rays, rendering and imaging according to the minimum value, and a minimum intensity projection algorithm is described as follows:

S21, data preprocessing: the data preprocessing flow of the minimum intensity projection is the same as the preprocessing flow of rendering the surface of the single tooth;

S22, edge smoothing and de-noising: MIP (Maximum Intensity Projection) processing comprises two core parts: eliminating the surface noise interference and eliminating the 'sawtooth' phenomenon; the value domain range of CT is [0, 1.0], the value domain range of the tooth surface is about more than or equal to 0.3, and the value domain range of the noise is about [0, 0.1]; a 'value rise' operation is carried out on the CT region in a surface region of an outer layer according to the relation, so as to eliminate the noise in the surface region; according to the AI results, the CT data region corresponding to the invalid value 0 region is endowed with the maximum value 1.0, then Gaussian Blur is carried out on the tooth surface with the reference of Step S01, and the CT value of the surface region after fuzzing is increased; the interference on the minimum value on an access path is not generated, and at the same time, the value of the tooth region is ensured to be less than 1.0; when the overall CT value of the tooth surface is increased through 'value rise', a 'highlight' region is generated on the tooth edge in the rendering result; a method for solving the 'highlight' phenomenon is that: the CT data before 'value rise' is copied, the 'value rise' operation is also carried out on the data, and the data is endowed with 0.5 (not 1.0); the noise on the surface is eliminated, but the tooth region cannot be separated; and the value 1.0 in the former 'value rise' is taken as mask information, namely the CT data of 'sawtooth' can be separated;

S23, rendering: two pieces of CT data after smoothing and de-noising is written into the GPU, and then a final minimum intensity projection effect is rendered according to the rendering flow.

Figure 2:
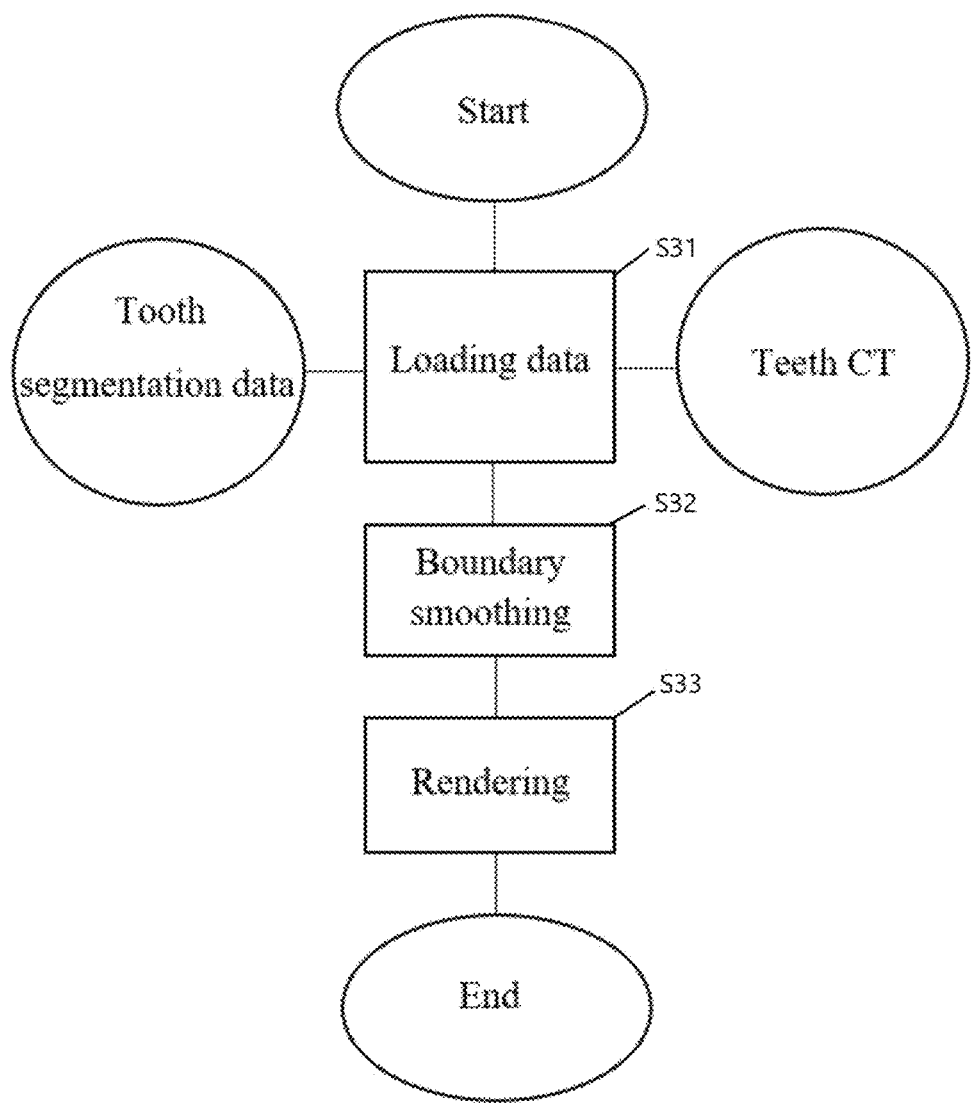
FIG. 2 is a flow chart of a minimum intensity projection algorithm of the present invention.

As shown in FIG. 2, 3), a 3D perspective mode, i.e. iso-surface rendering:

the whole implementation algorithm flow of the iso-surface rendering is described as follows:

S31, data preprocessing:

the data preprocessing flow of the iso-surface rendering is the same as the preprocessing flow of rendering the surface of the single tooth;

S32, boundary smoothing:

the boundary smoothing flow of the iso-surface rendering is the same as the smoothing flow of rendering the surface of the single tooth; and S33, rendering:

volume data rendering is obtained by accumulating colors (r, g, b) and transparency (alpha) of all the sampling points on a light projection path according to a formula, wherein the colors and the transparency are obtained by texture mapping according to sampling CT values, and therefore, a method for realizing specific CT value domain rendering by a function for controlling the transparency is designed; the core content thereof is generating the control function of the transparency according to gradient distribution information; firstly, the gradient value $\Delta f$ of any CT value $f(x, y, z)$ in the tooth region is calculated, the specific 'iso-surface' value fx and the original transparency alpha1 corresponding to the CT value $f(x,y,z)$ are selected, and the control function: alpha2=f($\Delta f$, fx)*alpha1 is generated according to the gradient value $\Delta f$ and the specific 'iso-surface' value fx; and a new transparency value is obtained after processing, alpha2 is taken as the new transparency value for volume rendering, namely the rendering effect near a specific 'iso-surface' fx region can be obtained.

The working principle of the device is described as follows: S01, archiving CT data: before using CT reading that supports a 'tooth lens', firstly, archiving the CT data of a patient and generating an only ID (Identity Card) used for marking the CT data;

S02, calculating AI (Artificial Intelligence) and generating AI results: starting a task by an AI calculation program, beginning to calculate the AI results, extracting anatomical structure and position information of the tooth, intraoral information and jaw relation coordinate information, and archiving extracted data to a directory at the same level with the CT data;

S03, entering CT reading by a client: opening software by the client, selecting the data of the patient and entering CT reading;

S04, downloading and loading the CT data: indexing the data from the archiving position by the software according to the ID of the selected CT data when entering the software and loading the data into a memory;

S05, opening a function of a tooth lens: searching the directory at the same level with the CT data in a traversing manner by the software after the loading of the CT data is completed, and viewing that whether result data generated by AI exists, wherein two situations are specifically described as follows:

1, the result data generated by AI exists: a 'tooth lens' button becomes a clickable state, and the function of the 'tooth lens' is opened; and 2, the result data generated by AI does not exist: the 'tooth lens' button becomes a forbidden state;

S06, selecting a corresponding tooth position in a tooth position list: clicking a function button of the 'tooth lens', selecting the corresponding tooth position from the tooth position list on the left side, reading the AI result data under the directory, in which the CT data is archived, by the software, and positioning a coronal plane, a sagittal plane and a horizontal plane to the position, at which the tooth is located, according to the information of the tooth position and the jaw relation coordinate information that are extracted by AI; and S07, selecting a 3D tooth rendering mode: the rendering for the tooth comprises three modes which are specifically described as follows:

1) the tooth body surface mode, i.e. the rendering for a single tooth:

acquiring a data range with the same size as CT (Computed Tomography) based on the AI calculation result in Step S02, wherein the AI position [x, y, z] corresponds to the original CT position [x, y, z], and the AI results also comprises a tooth segmentation list and tooth region information; and separating a tooth data region with a designated No. according to the information, wherein the algorithm flow thereof is specifically described as follows:

① data preprocessing: the loaded data comprises two parts: tooth AI segmentation results and CT; corresponding data is separated from the whole AI results according to the tooth No.; the data form thereof is a 3D array ([width, height, depth]); the AI results correspond to the CT values one to one in a data space; the corresponding CT data is separated according to the AI segmentation results; and interference data in CT can be removed according to effective information (non-zero value) in tooth segmentation data, so as to acquire an intact tooth outline form;

② boundary smoothing: a 'sawtooth' phenomenon appears on the tooth surface in tooth CT separated according to the AI tooth segmentation results, the generated 'sawtooth' is mainly caused by the precision of the segmentation results, and therefore, the surface needs to be smoothed before rendering; and through adoption of a Gaussian Blur algorithm, the noise is reduced, and the level of details is lowered; and the algorithm specifically comprises the following steps:

I. firstly, screening a boundary region:
if a 0 value exists in the corresponding AI values in a cubic region which takes an optional position [x, y, z] as the center and has the side length of 2, the region is judged to be the boundary region; and II. carrying out fuzzy processing on a boundary CT region: the size of a fuzzy kernel (3*3*3) is the most reasonable size; the CT value of the position [x, y, z] of the fuzzy center is determined commonly by surrounding 27 values; the CT contribution degree of each position is determined by the length from each position to the fuzzy center; and the contribution factor is exp(−length);

③ rendering: the CT data of the tooth after being smoothed is written into a GPU (Graphics Processing Unit), and an image is rendered finally;

2) the root canal perspective mode, i.e. minimum intensity projection:
the minimum intensity projection refers to a process of selecting the minimum value from sampling points obtained by volume data projected by rays, rendering and imaging according to the minimum value, and a minimum intensity projection algorithm is described as follows:

① data preprocessing: the data preprocessing flow of the minimum intensity projection is the same as the preprocessing flow of rendering the surface of the single tooth;

② edge smoothing and de-noising: MIP (Maximum Intensity Projection) processing comprises two core parts: eliminating the surface noise interference and eliminating the 'sawtooth' phenomenon; the value domain range of CT is [0, 1.0], the value domain range of the tooth surface is about more than or equal to 0.3, and the value domain range of the noise is about [0, 0.1]; a 'value rise' operation is carried out on the CT region in a surface region of an outer layer according to the relation, so as to eliminate the noise in the surface region; according to the AI results, the CT data region corresponding to the invalid value 0 region is endowed with the maximum value 1.0, then Gaussian Blur is carried out on the tooth surface with the reference of Step S01, and the CT value of the surface region after fuzzing is increased; the interference on the minimum value on an access path is not generated, and at the same time, the value of the tooth region is ensured to be less than 1.0; when the overall CT value of the tooth surface is increased through 'value rise', a 'highlight' region is generated on the tooth edge in the rendering result; a method for solving the 'highlight' phenomenon is that: the CT data before 'value rise' is copied, the 'value rise' operation is also carried out on the data, and the data is endowed with 0.5 (not 1.0); the noise on the surface is eliminated, but the tooth region cannot be separated; and the value 1.0 in the former 'value rise' is taken as mask information, namely the CT data of 'sawtooth' can be separated;

③ rendering: two pieces of CT data after smoothing and de-noising is written into the GPU, and then a final minimum intensity projection effect is rendered according to the rendering flow; and 3) the 3D perspective mode, i.e. iso-surface rendering:
the whole implementation algorithm flow of the iso-surface rendering is described as follows:

① data preprocessing:
the data preprocessing flow of the iso-surface rendering is the same as the preprocessing flow of rendering the surface of the single tooth;

② boundary smoothing:
the boundary smoothing flow of the iso-surface rendering is the same as the smoothing flow of rendering the surface of the single tooth; and ③ rendering:
volume data rendering is obtained by accumulating colors (r, g, b) and transparency (alpha) of all the sampling points on a light projection path according to a formula, wherein the colors and the transparency are obtained by texture mapping according to sampling CT values, and therefore, a method for realizing specific CT value domain rendering by a function for controlling the transparency is designed; the core content thereof is generating the control function of the transparency according to gradient distribution information; firstly, the gradient value $\Delta f$ of any CT value $f(x, y, z)$ in the tooth region is calculated, the specific 'iso-surface' value fx and the original transparency alpha1 corresponding to the CT value $f(x,y,z)$ are selected, and the control function: alpha2=f($\Delta f$, fx)*alpha1 is generated according to the gradient value $\Delta f$ and the specific 'iso-surface' value fx; and a new transparency value is obtained after processing, alpha2 is taken as the new transparency value for volume rendering, namely the rendering effect near a specific 'iso-surface' fx region can be obtained.

What is claimed is:
1. A method for using a CBCT for automatically positioning a tooth, which is characterized by comprising the following steps:
S01, archiving CT data;
S02, calculating AI and generating AI results;
S03, entering CT reading by a client;
S04, downloading and loading the CT data;
S05, opening a function of a tooth lens;
S06, selecting a corresponding tooth position in a tooth position list; and
S07, selecting a 3D tooth rendering mode;
wherein the rendering for the tooth comprises three modes which are specifically described as follows:
1) A tooth body surface mode;
2) A root canal perspective mode; and
3) A 3D perspective mode;
wherein the rendering of the three modes is specifically realized as follows:
1) The tooth body surface mode, i.e. the rendering for a single tooth:

acquiring a data range with the same size as CT based on the AI calculation result in Step S02, wherein the AI position [x, y, z] corresponds to the original CT position [x, y, z], and the AI results also comprises a tooth segmentation list and tooth region information; and separating a tooth data region with a designated No. according to the information, wherein the algorithm flow thereof is specifically described as follows:

① data preprocessing: the loaded data comprises two parts: tooth AI segmentation results and CT; corresponding data is separated from the whole AI results according to the tooth No.; the data form thereof is a 3D array ([width, height, depth]); the AI results correspond to the CT values one to one in a data space; the corresponding CT data is separated according to the AI segmentation results; and interference data in CT can be removed according to effective information (non-zero value) in tooth segmentation data, so as to acquire an intact tooth outline form;

② boundary smoothing: a 'sawtooth' phenomenon appears on the tooth surface in tooth CT separated according to the AI tooth segmentation results, the generated 'sawtooth' is mainly caused by the precision of the segmentation results, and therefore, the surface needs to be smoothed before rendering; and through adoption of a Gaussian Blur algorithm, the noise is reduced, and the level of details is lowered; and the algorithm specifically comprises the following steps:
I. firstly, screening a boundary region:
if a 0 value exists in the corresponding AI values in a cubic region which takes an optional position [x, y, z] as the center and has the side length of 2, the region is judged to be the boundary region; and
II. carrying out fuzzy processing on a boundary CT region: the size of a fuzzy kernel (3*3*3) is the most reasonable size; the CT value of the position [x, y, z] of the fuzzy center is determined commonly by surrounding 27 values; the CT contribution degree of each position is determined by the length from each position to the fuzzy center; and the contribution factor is exp(-length);

③ rendering: the CT data of the tooth after being smoothed is written into a GPU, and an image is rendered finally;

2) The root canal perspective mode, i.e. minimum intensity projection:
the minimum intensity projection refers to a process of selecting the minimum value from sampling points obtained by volume data projected by rays, rendering and imaging according to the minimum value, and a minimum intensity projection algorithm is described as follows:

① data preprocessing: the data preprocessing flow of the minimum intensity projection is the same as the pre-processing flow of rendering the surface of the single tooth;

② edge smoothing and de-noising: MIP processing comprises two core parts: eliminating the surface noise interference and eliminating the 'sawtooth' phenomenon; the value domain range of CT is [0, 1.0], the value domain range of the tooth surface is about more than or equal to 0.3, and the value domain range of the noise is about [0, 0.1]; a 'value rise' operation is carried out on the CT region in a surface region of an outer layer according to the relation, so as to eliminate the noise in the surface region; according to the AI results, the CT data region corresponding to the invalid value 0 region is endowed with the maximum value 1.0, then Gaussian Blur is carried out on the tooth surface with the reference of Step S01, and the CT value of the surface region after fuzzing is increased; the interference on the minimum value on an access path is not generated, and at the same time, the value of the tooth region is ensured to be less than 1.0: when the overall CT value of the tooth surface is increased through 'value rise', a 'highlight' region is generated on the tooth edge in the rendering result; a method for solving the 'highlight' phenomenon is that: the CT data before 'value rise' is copied, the 'value rise' operation is also carried out on the data, and the data is endowed with 0.5; the noise on the surface is eliminated, but the tooth region cannot be separated; and the value 1.0 in the former 'value rise' is taken as mask information, namely the CT data of 'sawtooth' can be separated;

③ rendering: two pieces of CT data after smoothing and de-noising is written into the GPU, and then a final minimum intensity projection effect is rendered according to the rendering flow; and 3) The 3D perspective mode, i.e. iso-surface rendering:
the whole implementation algorithm flow of the iso-surface rendering is described as follows:

① data preprocessing:
the data preprocessing flow of the iso-surface rendering is the same as the preprocessing flow of rendering the surface of the single tooth;

② boundary smoothing:
the boundary smoothing flow of the iso-surface rendering is the same as the smoothing flow of rendering the surface of the single tooth; and ③ Rendering:
volume data rendering is obtained by accumulating colors (r, g, b) and transparency (alpha) of all the sampling points on a light projection path according to a formula, wherein the colors and the transparency are obtained by texture mapping according to sampling CT values, and therefore, a method for realizing specific CT value domain rendering by a function for controlling the transparency is designed; the core content thereof is generating the control function of the transparency according to gradient distribution information; firstly, the gradient value $\Delta f$ of any CT value $f(x,y,z)$ in the tooth region is calculated, the specific 'iso-surface' value fx and the original transparency alpha1 corresponding to the CT value $f(x,y,z)$ are selected, and the control function: alpha2=f($\Delta f$,fx)*alpha1 is generated according to the gradient value $\Delta f$ and the specific 'iso-surface' value fx; and a new transparency value is obtained after processing, alpha2 is taken as the new transparency value for volume rendering, namely the rendering effect near a specific 'iso-surface' fx region can be obtained.

2. The method for using the CBCT for automatically positioning the tooth according to claim 1, wherein, according to Step S01, before using CT reading that supports a 'tooth lens', firstly, archiving the CT data of a patient and generating an only ID used for marking the CT data.

3. The method for using the CBCT for automatically positioning the tooth according to claim 1, wherein, according to Step S02, starting a task by an AI calculation program, beginning to calculate the AI results, extracting anatomical structure and position information of the tooth, intraoral information and jaw relation coordinate information, and archiving extracted data to a directory at the same level with the CT data.

4. The method for using the CBCT for automatically positioning the tooth according to claim 1, wherein, according to Step S03, opening software by a client, selecting the data of the patient and entering CT reading.

5. The method for using the CBCT for automatically positioning the tooth according to claim 1, wherein, according to Step S04, indexing the data from the archiving position by the software according to the ID of the selected CT data when entering the software and loading the data into a memory.

6. The method for using the CBCT for automatically positioning the tooth according to claim 1, wherein, according to Step S05, searching the directory at the same level with the CT data in a traversing manner by the software after the loading of the CT data is completed, and viewing that whether result data generated by AI exists, wherein two situations are specifically described as follows:

1) The result data generated by AI exists: a 'tooth lens' button becomes a clickable state, and the function of the 'tooth lens' is opened; and
2) the result data generated by AI does not exist: the 'tooth lens' button becomes a forbidden state.

7. The method for using the CBCT for automatically positioning the tooth according to claim 1, wherein, according to Step S06, clicking a function button of the 'tooth lens', selecting a corresponding tooth position from a tooth position list on the left side, reading the AI result data under the directory, in which the CT data is archived, by the software, and positioning a coronal plane, a sagittal plane and a horizontal plane to the position, at which the tooth is located, according to the tooth position information and the jaw relation coordinate information that are extracted by AI.

* * * * *